INVENTOR.
HUBERT L. RAPER

BY Robert G Rogers

ATTORNEY

United States Patent Office 3,515,905
Patented June 2, 1970

3,515,905
MULTIPLEXER SWITCHING NETWORK USING A CURRENT SWITCH AND FLOATING POWER SUPPLY
Hubert L. Raper, La Habra, Calif., assignor to North American Rockwell Corporation, a corporation of Delaware
Filed Mar. 20, 1967, Ser. No. 624,506
Int. Cl. H03k 17/00
U.S. Cl. 307—254
4 Claims

ABSTRACT OF THE DISCLOSURE

A multiplexer transistorized switching network in which each transistor switch of the network uses a current control switch for turning the transistorized switch on and a floating power supply for eliminating error current conduction paths between inputs to the network and ground and for holding individual ones of said transistorized switches on for an unlimited time. The current control switches are interposed between each transistorized switch and the supply.

BACKGROUND OF THE INVENTION

Field of the invention

This invention relates to a multiplexer transistorized switching network and, more particularly, to such a network wherein all switches of the network use a floating power supply common to all switches and individual current control switches interposed between each switch and the supply.

Description of prior art

The type of switching network described herein was initially developed by Bright. As a result, the switch in its basic embodiment was described as a "Bright Switch." Bright taught connecting a pair of transistors of like conductivity types back to back; that is, emitters and the bases of the transistors were individually interconected. The collector electrodes of the two transistors thus provided the terminals of the network for bilateral signal transmission. Control signals were applied to the base electrodes. A transformer driving circuit was used to supply current to the bases for turning the switches on. When the switches were turned on, the conduction path between the input and output offered a relatively low impedance to current flow. Subsequently, the Bright switch was modified so that capacitors, floating with respect to ground, were used to supply base currents.

However, even with the improvements, two major problems remained. Capacitor and/or transformer drivers have an "on" time which is limited by the decay of charge in the capacitor and by the change of current through the inductor. In other words, the switching circuit can remain on only so long as the capacitor and inductor retain their charges. In addition, and for the same reason, these devices do not provide for a constant drive current. If the drive current varies from one switch to another, the outputs may also vary.

A search disclosed a plurality of patents in classes 307(88.5); 179(15); and 340(174.1) which are summarized in the following paragraphs.

Horton, Pat. No. 2,970,227 teaches a transistorized voltage transfer switch utilizing a pair of back to back connected npn transistors in a circuit between input and output terminals. The emitter electrodes are grounded and the base electrodes are connected together and to a power supply by way of a manually operated switch and a capacitor charging circuit.

Jensen, Pat. No. 2,776,382, teaches a transistor which could be used to replace the manually operated switch in such a manner as to control a transistor series switch.

Fedder, Pat. No. 3,011,074, teaches a transistor bilateral switching circuit comprising a pair of back to back connected transistors in which the base electrodes are connected to a control signal applied to the primary of a pulse transformer. In addition, Fedder teaches biasing the bases from the DC current source through a tertiary winding on the pulse transformer.

As indicated in the Fedder patent, with the advent of high speed electrical systems, the need has arisen for electronic gating or switching circuits capable of exhibiting very fast response times. It is also desirable that the gating circuits have characteristics of essentially infinite impedance to current flow when in the nonconducting state and essentially zero impedance to current flow when in the conducting state. In addition, it is desirable that the gating circuits require very low power for control purposes and that the control circuitry be isolated from the signal transmission path.

The present invention satisfies the requirement outlined in the Fedder patent and other patents comprising the prior art and in addition, provides a switching circuit which has a capability of relatively unlimited "on" time and the additional capability of providing a constant control current to the bases of the switches.

SUMMARY OF THE INVENTION

Briefly, the invention comprises a semiconductor device having control electrode means connected through a current switch to one terminal of a power supply means floating with respect to ground, first and second electrode means connected between input and output terminals and a third electrode means connected to the other terminal of the floating power supply.

A specific embodiment of the invention comprises a pair of transistors of like conductivity connected in series with two like electrodes connected together (for forming a series switch) and with two other electrodes connected between input and output terminals. The base electrodes are connected together and are connected to a floating power supply through a current control switch interposed between one terminal of the power supply and the base electrodes. The current switch controls the current from the supply to the base and therefore, the conduction of the two series transistors in the input-output circuit. Means are provided for actuating the current switch and for turning the transistors off when the current switch is not actuated.

A plurality of such semiconductor devices are interconnected with one floating power supply for forming a multiplexer switching network. Means are provided for actuating the current switch of selected ones of said transistorized series switches.

In other embodiments, instead of using back to back transistors connected in a series combination, double emitter semiconductor devices and the like can be utilized. In still other embodiments, the current switch could include amplification, or gating, means so that relatively small control currents (and therefore low power) could be used to control the conduction of the series transistors. In addition, the amplification means provides constant control current to the bases of the switch.

Therefore, it is an object of this invention to provide an improved multiplexer switching network.

Still another object of this invention is to provide an improved switching circuit using a floating power supply.

Still another object of this invention is to provide a switching circuit having a current switch and floating power supply.

Still another object of this invention is to provide an improved switching circuit in which the control current is relatively constant during the period that the switching circuit is turned on.

A still further object of this invention is to provide an improved switching circuit having an improved "on" time capability.

These and other objects of this invention will become more apparent in connection with the following drawings.

DESCRIPTION OF PREFERRED EMBODIMENTS

Figure 1:
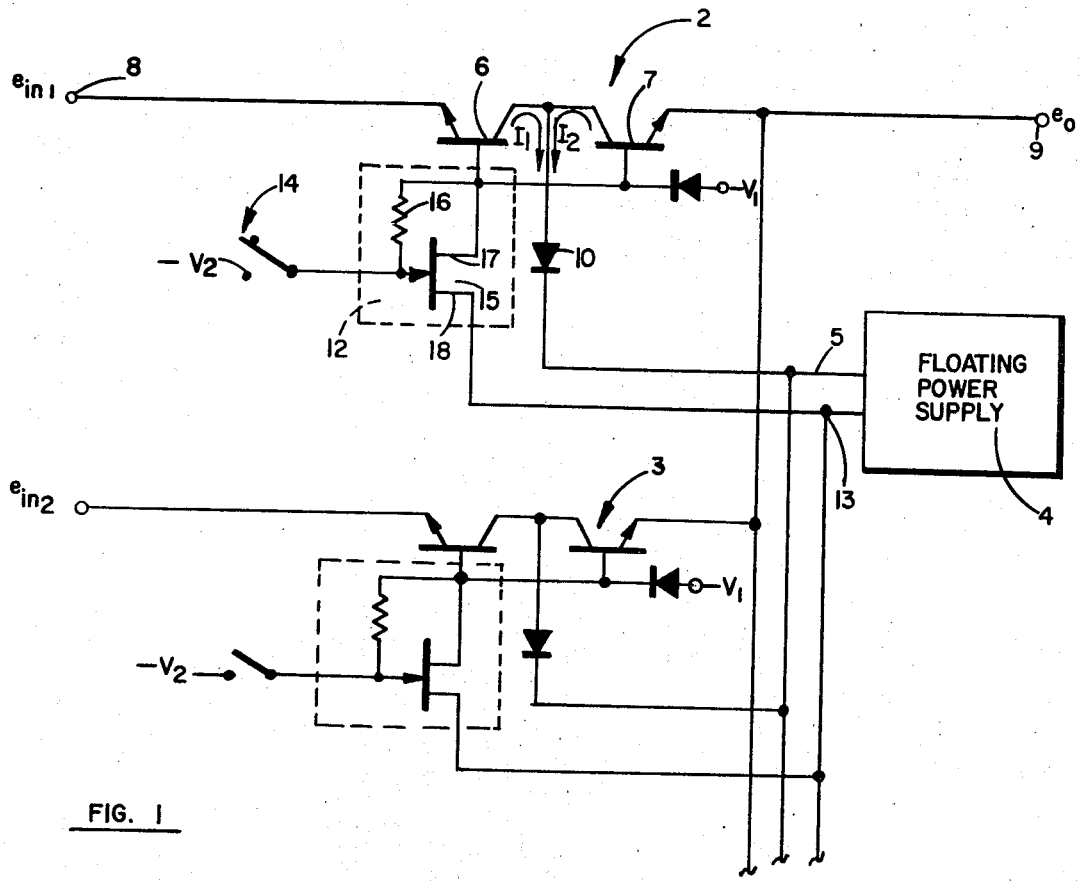
FIG. 1 shows one embodiment of a multiplexer switching network having a controlled current switch and a floating power supply.

FIG. 1 shows transistorized multiplexer switching network 1 comprising switches 2, 3 . . . $n$. The switches are connected to floating power supply 4 which is common to all the switches. Although a plurality of switches are shown as comprising the multiplexer network, it should be obvious that in a specific case only one such switch might be needed and, therefore, the other switches could be eliminated. It should also be obvious that although npn transistors are described in connection with the various embodiments, pnp type transistors could be substituted by persons having ordinary skills in the art. Likewise, although series connected transistors are shown, it should be obvious that double emitter devices and the like could be substituted. Such devices are formed with double emitters and as a result, the necessity for interconnecting the other electrodes in the switching circuit as described herein is eliminated.

Switching device 2 comprises a pair of npn transistors 6 and 7 connected back to back between terminals 8 and 9. Terminal 8 comprises the input terminal for $e_{in\ 1}$ and terminal point 9 comprises the common output terminal for all the switches. The collectors of the transistors are directly interconnected and are connected to diode 10. Diode 10 interconnects one side 5 of the floating power supply with the interconnected collectors. The diode is not necessaary for double emitter devices and the like. It is necessary, however, where emitters are interconnected and collectors are used as input and output terminals.

The bases of the transistors are interconnected and are connected to voltage source $-V_1$ through diode 11 and to current switching device 12 which is interposed between the bases and the other side 13 of the floating power supply. For the embodiment shown, side 13 of the supplyis assumed to be at a positive voltage potential with respect to side 5. It is noted that the power supply does not have a terminal connected to ground.

The current switch includes an input from $-V_2$ through switch means 14. The switch comprises field effect transistor 15 having its gate electrode connected to the interconnected bases through resistor 16. Electrode 17 is connected directly to the bases and electrode 18 is connected directly to the floating power supply.

Switches 3 through $n$ are similarly comprised of back to back npn transistors having current switches interconnected between bases and terminal 13 of the floating power supply. Each of the switches also includes a diode directly connected between the collectors and the other side 5 of the floating power supply. A control voltage, $-V_2$, is connected to each current switch through a switching means, and the bases are connected to a cut-off voltage, $-V_1$, through a diode means.

As is well known in the art, transistors exhibit a relatively low impedance or a relatively high impedance from collector to emitter depending on the base control voltage. For example, a negative voltage on the base of an npn transistor turns the transistor off so that it has a relatively high impedance to current flow between its collector and emitter. Conversely, a positive voltage on the base of an npn transistor turns the transistor on so that it has a relatively low impedance to current flow between its collector and emitter electrodes. The opposite set of conditions is true for a pnp transistor. Although either type of transistor may be used in this invention, the use of npn transistors as shown in FIG. 1 is assumed for purposes of this description.

In operation, one of the switch means between the current switching devices associated with each of the plurality of switches is open to disconnect the control voltage, $-V_2$, from base electrode of the field effect transistor comprising the current switch. The other switch means are closed so that only one switch is turned on. For example, assume that switch 14 of the switch 2 is opened so that the voltage $-V_2$ is disconnected from the gate electrode of field effect transistor device 15. Under those conditions, the field effect device 15 turns on so that the voltage appearing at terminal 13 is connected to the base electrodes. Diode 11 is back-biased to disconnect $-V_1$ from the base electrode. The base to collector junctions of the transistors 6 and 7 are turned on and relatively small currents, $I_1$ and $I_2$, are caused to flow through diode 10 to the common side of the floating power supply.

Subsequently, when an input voltage appears at terminal 8, it is conducted to terminal 9 without the normal voltage drop associated with transistors. The $V_{ca's}$ of transistors 6 and 7 provide opposing voltage drops which cancel so that the input voltage signal appears at the output.

When switch 14 is closed, control voltage $-V_2$ is connected to the gate electrode of transistor 15. Diode 11 is turned on so that $-V_1$ minus the diode drop provides cut-off voltage for the transistors 6 and 7. The base electrode of field effect transistor 15 is held at a voltage more negative than its source and drain electrode so that the device is turned off. Diode 10 is back-biased so that no current flows through the transistors and a relatively high impedance is exhibited between the input and output terminals. The same operational sequence would be true for other switches comprising the network.

Figure 2:
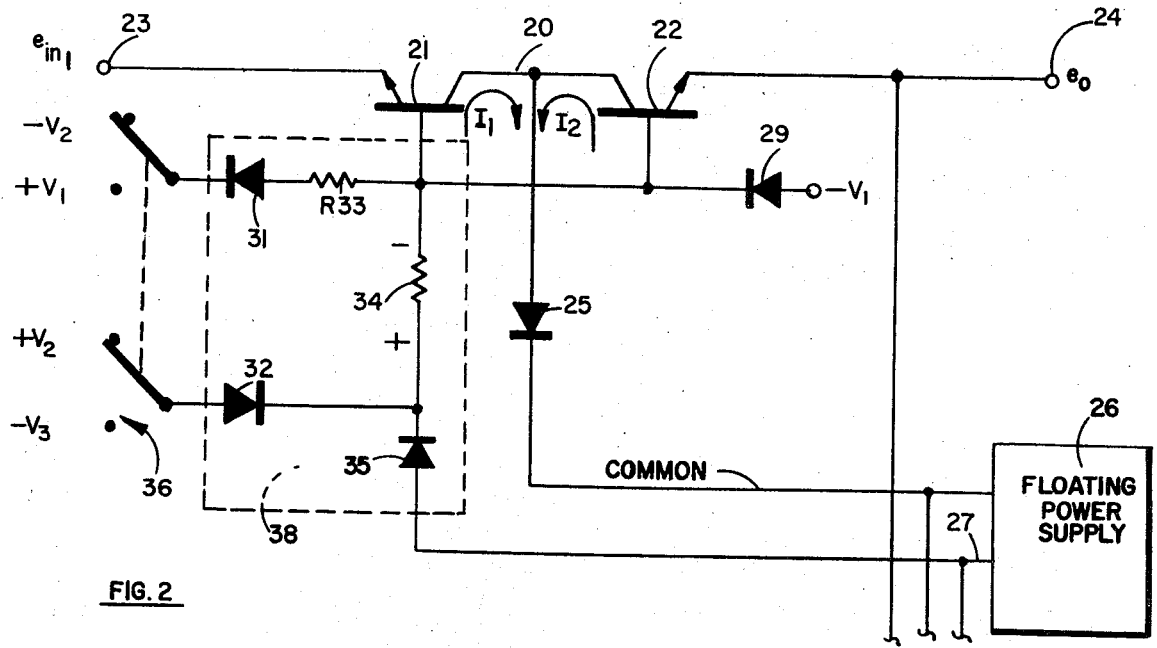
FIG. 2 shows a multiplexer switching network having different type current switch and floating power supply.

FIG. 2 shows a second multiplexer network comprising switching device 20. Other switches comprising the network have been omitted for the sake of clarity. The number of switches may vary with the particular application of the network.

Switching device 20 includes back to back connected npn transistors 21 and 22. The transistors are connected between input terminal 23 and output terminal 24. The collectors of the transistors are connected together through diode 25 to one side of floating power supply 26. The bases of the transistors are connected together to the other side 27 of the floating power supply through current switch 38. The bases are also connected to a source of cut-off voltage $-V_1$ through diode 29. The current switch is connected through switch means 36 for controlling the period of time during which the switch is turned on. Switch means 36 is connected to voltage sources, $-V_2$, $+V_2$, $+V_1$, and $-V_3$.

The current switch 38 is comprised of diodes 31 and 32 connected to the terminals of the switch means. Resistor 33 is connected between diode 31 and thse common connection between the base electrodes of the two transistors. Resistor 34 is connected between the base electrodes and to the negative side of diode 32. Diode 35 is connected between resistor 34 and side 27 of the floating power supply.

In operation, when the switches are in the "up" position, voltage $-V_2$ turns diode 31 on and voltage $+V_2$ turns diode 32 on. As a result, diode 35 is turned off and diode 29 is turned on and the bases of the transistors are connected to a voltage approximately equal to $-V_1$. Transistors 21 and 22 are turned off. A voltage equivalent to $+V_2+(-V_1)$ is dropped across resistor 34. Ordinarily, the voltages, $-V_1$ and $+V_2$, are relatively large and as a result, the drop causes substantial power to be dissipated from resistor 34. It would be desirable to reduce the power dissipated by increasing the size of the resistor. However, the resistor size is fixed by the value of the power supply voltage and the amount of base current needed to turn transistors 21 and 22 on. If the drive current from the power supply could be reduced, the size of the resistor could be increased and the power dissipation reduced.

When switch means 36 is turned to the "down" position, $+V_1$ turns diode 31 off and $-V_3$ turns diode 32 off. Diode 35 turns on because of the positive power supply voltage. Diode 29 becomes back-biased and is turned off. The bases are held at a positive potential and conduction occurs in the form of current $I_1$ and $I_2$. The on transistors 21 and 22 have cancelling drops as previously described so that any voltage appearing at the input terminal is conducted to the output terminal with negligible series impedance.

Figure 3:
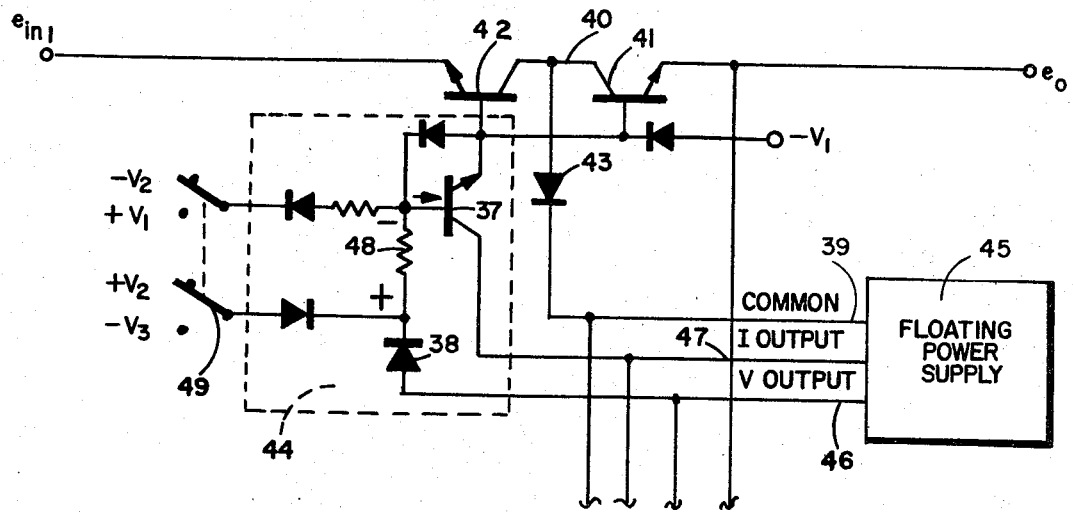
FIG. 3 shows a multiplexer switching network having a current switch for amplifying relatively small control current and a floating power supply.

FIG. 3 shows a similarly connected switch 40 comprising transistors 41 and 42 connected back to back between an input and an output terminal. The collectors are interconnected to terminal 39 of power supply 45 through diode means 43 and the bases are interconnected through current switch means 44 to terminals 46 and 47 of the power supply. The power supply normally has two terminals connected between the collectors and the bases. However, in the present embodiment, the floating power supply includes an additional terminal 47 which provides a current output to transistor 37 of the current switch.

Current switching means 44 is similar to the current switch means described in connection with FIG. 2, except for the addition of transistor 37 for amplifying the current received at its base whenever switch means 49 is in the "down" position.

The current switch of FIG. 3, in effect, provides an improved current switch with reduced power dissipation. In operation, when the switch means 49 is in the "up" position, the diodes are turned on and a voltage drop occurs across resistor 48 for turning diode 38 off and transistor 37 off and holding the bases of transistors 41 and 42 at a negative voltage $(-V_1)$. Resistor 48 can be made relatively large for this purpose so that a relatively small power dissipation occurs. When the switch means 49 is in the "down" position, the diodes are turned off. Diode 38 of the current switch is turned on and a relatively small base current is supplied to transistor 37 for turning transistor 37 on, thereby connecting the constant current output terminal 47 of the power supply to the bases of transistors 41 and 42. Ordinarily, the size of the resistor is selected so that the current supplied is sufficient to turn transistor 37 on. In effect, the relatively small base current is applied by transistor 37 so that resistor 48 can be relatively high for reducing power dissipation when the current switch is turned off.

Although manual switch means have been illustrated and described in connection with the invention, it should be obvious that other types of switches could also be used for connecting and disconnecting control voltages to the current switch. For example, a diode matrix could be used to turn any one of a plurality of current switches on for controlling which of the switches comprising a multiplexer network are operable at a given time to connect an input to the output. It is believed that diode matrices which could be used for connecting the voltages to the current switch are within the design abilities of a person having ordinary skills in the art. For that reason, additional details and descriptions are not included.

Although the invention has been described and illustrated in detail, it is to be understood that the same is by way of illustration and example only, and is not to be taken by way of limitation; the spirit and scope of this invention being limited only by the terms of the appended claims.

I claim:
1. A multiplexer switching network comprising,
semiconductor means having first and second electrodes connected between first and second terminals, control electrode means connected to one terminal of a source of power which is floating with respect to electrical ground, and third electrode means connected between said first and second electrodes and another terminal of said source of power,
current switch means connected between said control electrode means and said one terminal, including control means turning said current switch on at selected intervals for connecting said power supply to the control electrode means for turning said semiconductor means on, said control means also having means for disconnecting said power supply from the control electrode means, said power supply not supplying power when said current switch is turned off,
a second switching means connected between the third electrode means and the source of power for disconnecting the third electrode means from the source of power when the current switch is off,
third switching means connected between said control electrode means and a voltage source for turning said semiconductor means off when said current switch means is turned off,
second semiconductor means having first and second electrodes connected between third and said second terminals, including control electrode means connected to said one terminal of the source of power, and third electrode means connected to the other terminal of said source of power,
second current switch means interconnected between the control electrode of said semiconductor means and said one terminal, control means for turning said second current switch on for connecting said power supply to the control electrode means of said second semiconductor means for turning said second semiconductor means on independently of said first semiconductor means.

2. The combination as recited in claim 1, wherein said semiconductor means comprises a pair of similar conductivity type transistors each having an emitter, a base and a collector, said bases being connected together to form said control electrode means and said collectors being connected together to form said third electrode means, with one of said emitters being connected to said first terminal and another of said emitters being connected to said second terminal.

3. A multiplexer switching network comprising,
semiconductor means having first and second electrodes connected between first and second terminals, control electrode means connected to one terminal of a source of power which is floating with respect to electrical ground, and third electrode means connected between said first and second electrodes and another terminal of said source of power,
current switch means connected between said control electrode means and said one terminal, including control means turning said current switch on at selected intervals for connecting said power supply to the control electrode means for turning said semiconductor means on, said control means also having means for disconnecting said power supply from the control electrode means, said power supply not supplying power when said current switch is turned off,
said current switch means includes amplifier means connected between said control electrode means and said source of power, said amplifier having a second control electrode connected to said source of power and to input signal means, second switch means interposed between the second control electrode and said input signal means for disconnecting said input signal means from said second control electrode whereby said amplifier is turned on for supplying current to said control electrode means.

4. A multiplexer switching network comprising, semiconductor means having first and second electrodes connected between first and second terminals, control electrode means connected to one terminal of a source of power which is floating with respect to electrical ground, and third electrode means connected between said first and second electrodes and another terminal of said source of power, current switch means connected between said control electrode means and said one terminal including control means turning said current switch on at selected intervals for connecting said power supply to the control electrode means for turning said semiconductor means on, said control means also having means for disconnecting said power supply from the control electrode means, said power supply not supplying power when said current switch is turned off, said current switch means includes impedance means connected between said source of power and said control electrode means, first control signal means connected to a first side of said impedance means, and second control signal means connected to the other side of said impedance means, including means for connecting said signals across said impedance means, said signals providing a first polarity voltage drop across said impedance means for turning said semiconductor means off and a second polarity voltage drop across said impedance means for turning said semiconductor means on, said impedance means having a magnitude sufficient for permitting current to flow to said control electrode means for turning said semiconductor means on when signals having said first polarity are impressed across said impedance means and for turning said semiconductor means off when signals having said second polarity are impressed across said impedance means.

References Cited

UNITED STATES PATENTS

| | | | |
|---|---|---|---|
| 2,891,171 | 6/1959 | Shockley | 307—249 |
| 2,935,623 | 5/1960 | Van Overbeck et al. | 307—250 |
| 2,990,477 | 6/1961 | MacIntyre | 307—317 |
| 3,119,064 | 1/1964 | Hillis | 307—254 |
| 3,156,831 | 11/1964 | Baude | 307—254 |
| 3,247,323 | 4/1966 | Carroll | 307—250 |
| 3,287,623 | 11/1966 | Valancius | 307—254 |
| 3,292,010 | 12/1966 | Brown et al. | 307—257 |
| 3,389,272 | 6/1968 | Cherry | 307—257 |

DONALD D. FORRER, Primary Examiner

J. D. FREW, Assistant Examiner

U.S. Cl. X.R.

307—249, 250, 251, 256